US008888655B2

(12) United States Patent
Saur

(10) Patent No.: US 8,888,655 B2
(45) Date of Patent: Nov. 18, 2014

(54) HAND-HELD POWER TOOL

(75) Inventor: Dietmar Saur, Gomaringen (DE)

(73) Assignee: Robert Bosch GmbH, Stuttgart (DE)

( * ) Notice: Subject to any disclaimer, the term of this patent is extended or adjusted under 35 U.S.C. 154(b) by 233 days.

(21) Appl. No.: 13/397,244

(22) Filed: Feb. 15, 2012

(65) Prior Publication Data

US 2012/0214640 A1 Aug. 23, 2012

(30) Foreign Application Priority Data

Feb. 22, 2011 (DE) ......................... 10 2011 004 495

(51) Int. Cl.

| | |
|---|---|
| ***B60W 10/04*** | (2006.01) |
| ***B60W 10/10*** | (2012.01) |
| ***B25F 5/00*** | (2006.01) |
| ***B25B 21/00*** | (2006.01) |
| ***B25B 23/14*** | (2006.01) |

(52) U.S. Cl.

CPC . *B25F 5/00* (2013.01); *B25B 21/00* (2013.01); *B25B 23/141* (2013.01)

USPC .......................................................... 477/107

(58) Field of Classification Search

USPC ............ 477/107, 110, 111; 173/47, 178, 216, 173/217; 464/38

See application file for complete search history.

(56) References Cited

U.S. PATENT DOCUMENTS

| | | | | |
|---|---|---|---|---|
| 5,816,121 | A * | 10/1998 | Yoshimizu et al. | 81/469 |
| 6,199,642 | B1 * | 3/2001 | Becker et al. | 173/217 |
| 7,794,355 | B2 * | 9/2010 | Pusateri | 475/331 |
| 2010/0175902 | A1 * | 7/2010 | Rejman et al. | 173/1 |
| 2010/0212923 | A1 * | 8/2010 | Zimmermann et al. | 173/47 |
| 2011/0000691 | A1 * | 1/2011 | Roehm | 173/47 |
| 2011/0127941 | A1 * | 6/2011 | Hirabayashi et al. | 318/476 |
| 2011/0139473 | A1 * | 6/2011 | Braun et al. | 173/20 |

FOREIGN PATENT DOCUMENTS

| | | |
|---|---|---|
| EP | 2 077 177 | 7/2009 |
| EP | 2 529 895 | 12/2012 |

* cited by examiner

*Primary Examiner* — Justin Holmes

(74) *Attorney, Agent, or Firm* — Kenyon & Kenyon LLP

(57) ABSTRACT

In a hand-held power tool having a gear transmission, which is drivable by a motor, for driving a drive shaft, the gear transmission being shiftable at least between a first gear and a second gear via a gear shifting device, the gear shifting device has a sensor system, which is connected to an electronic unit, for detecting a gear shifting procedure. The electronic unit is designed for the purpose of activating the motor using predefined motor parameters which are assigned to the detected gear shifting procedure, on the basis of a gear shifting signal which is generated by the sensor system when a gear shifting procedure is detected.

10 Claims, 3 Drawing Sheets

HAND-HELD POWER TOOL

FIELD OF THE INVENTION

The present invention relates to a hand-held power tool having a gear transmission, which is drivable by a motor, for driving a drive shaft, the gear transmission being shiftable at least between a first gear and a second gear via a gear shifting device.

BACKGROUND INFORMATION

Such hand-held power tools are known from the related art, which have a gear transmission drivable by an assigned motor, the gear transmission being shiftable via a gear shifting device between a first gear having a comparatively high torque and a second gear having a comparatively low torque, for example. Before and after a corresponding gear shifting procedure, the motor is activated using particular applicable motor parameters, which are assigned to a particular shifted gear of the gear transmission, a corresponding activation of the motor taking place via a so-called on/off switch, which is directly activatable via a manual switch, which is operable by a user of the hand-held power tool, to establish the particular applicable motor parameter. In this case, an operation of the manual switch causes a resistance change on a potentiometer path assigned to the on/off switch, so that a control signal, which is a function of a particular active resistance value of the potentiometer path, is supplied to a power switch assigned to the on/off switch to establish the applicable motor parameter.

The related art has the disadvantage that such a use of a potentiometer path only allows generation of a comparatively imprecise control signal, since only indirect detection of a corresponding gear shifting procedure occurs, so that undesirable tolerances in the recognition of the gear shifting procedure or a corresponding spread result. In addition, a comparatively large installation space and therefore a design of a comparatively large on/off switch housing is necessary to implement a suitable potentiometer path. This requires a tool housing of the hand-held power tool which is designed as sufficiently large to accommodate the on/off switch housing.

SUMMARY OF THE INVENTION

An object of the present invention is therefore to provide a hand-held power tool having a reduced installation space, during the operation of which a direct recognition of gear shifting procedures having reduced tolerances is made possible.

This object is achieved by a hand-held power tool having a gear transmission, which is drivable by a motor, to drive a drive shaft. The gear transmission is shiftable via a gear shifting device between at least one first gear and one second gear. The gear shifting device has a sensor system, which is connected to an electronic unit, for detecting a gear shifting procedure. The electronic unit is designed for the purpose of activating the motor using predefined motor parameters, which are assigned to the detected gear shifting procedure, on the basis of a gear shifting signal generated by the sensor system when a gear shifting procedure is detected.

The present invention therefore allows the provision of a hand-held power tool, during the operation of which secure and reliable detection of gear shifting procedures is made possible.

According to one specific embodiment, the sensor system is designed for the purpose of detecting a gear shifting procedure in a contactless manner.

Simple and precise detection of gear shifting procedures may therefore be made possible using a sensor system which is robust with respect to mechanical vibrations, dirt, abrasion, and wear.

The sensor system preferably has a capacitive, magnetic, inductive, and/or optical sensor.

An uncomplicated and compact sensor system may therefore be provided.

According to one specific embodiment, the sensor system is designed for the purpose of detecting a gear shifting procedure using contact.

Secure and reliable detection of gear shifting procedures may thus be made possible.

The sensor system preferably has an ohmic sensor.

A robust and cost-effective sensor system may therefore be provided.

According to one specific embodiment, the gear shifting device has a gear shift linkage for the mechanical shift between the first gear and the second gear, which is connected to a signal transducer assigned to the sensor system.

The present invention therefore allows the provision of a simple and reliable gear shifting device.

The gear shift linkage is preferably connected to a manual switch for turning on the motor, the signal transducer being displaceable relative to the sensor via the gear shift linkage by operating the manual switch.

A robust and cost-effective gear shifting device may therefore be provided.

The sensor system is preferably situated in the area of the gear transmission.

A compact hand-held power tool having a comparatively small installation space may therefore be provided.

According to one specific embodiment, a signal transducer which is assigned to the sensor system is connected to a manual switch for turning on the motor and is displaceable relative to the sensor by operating the manual switch.

The present invention therefore allows the provision of a compact hand-held power tool having a comparatively simple construction.

DETAILED DESCRIPTION

Figure 1:
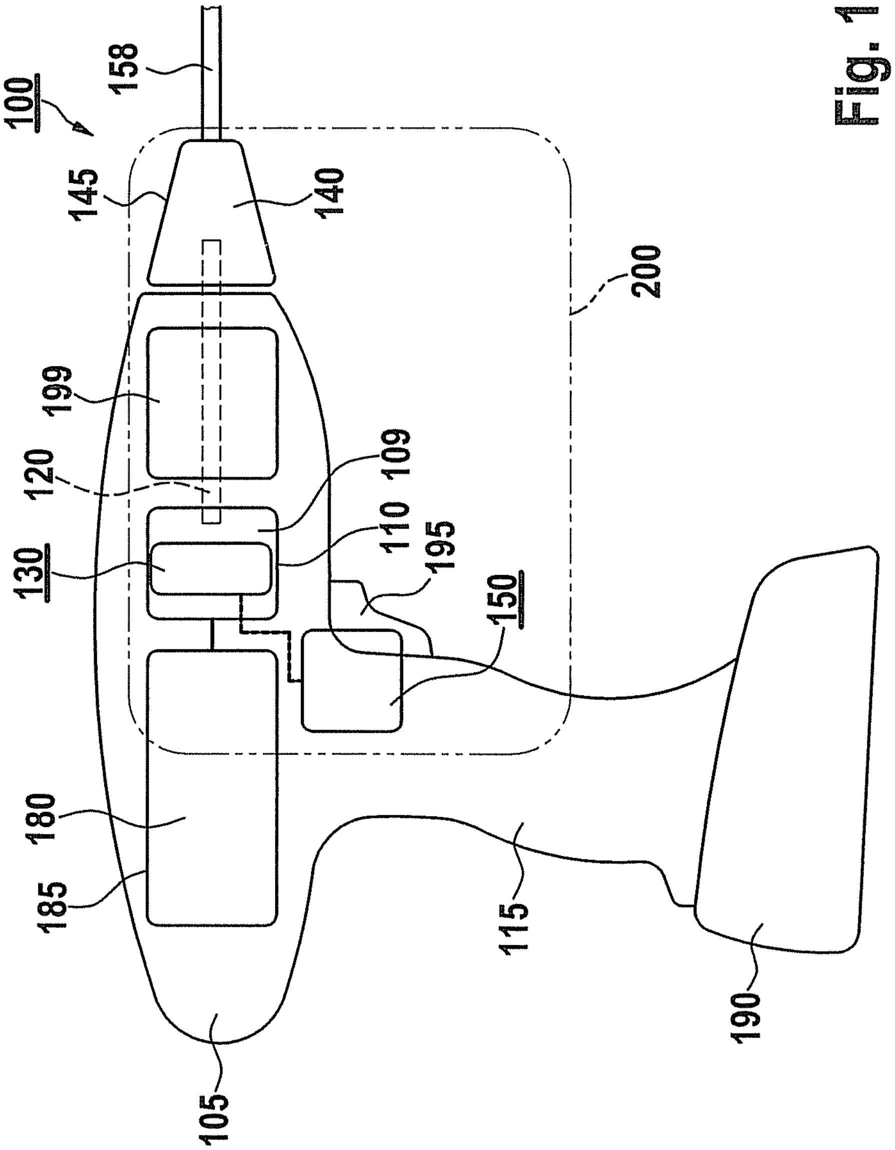
FIG. 1 shows a schematic view of a hand-held power tool according to one specific embodiment.

FIG. 1 shows an exemplary hand-held power tool 100, which has a tool housing 105 including a handle 115. According to one specific embodiment, hand-held power tool 100 is mechanically and electrically connectable to a battery pack 190 for network-independent power supply. Hand-held power tool 100 is designed as a battery-powered drill/driver in FIG. 1, for example. However, it is to be noted that the present invention is not restricted to battery-powered drill/drivers, but rather may be used in different hand-held power tools, in which a tool is set into rotations, independently of whether the hand-held power tool is operable in a network-dependent or network-independent manner using battery pack 190, e.g., in a screwdriver or battery-powered screwdriver, a percussion drill or battery-powered percussion drill, etc.

An electric drive motor 180, which is supplied with power by battery pack 190, and a gear transmission 109 are situated in tool housing 105. Drive motor 180 is connected via gear transmission 109 to a drive shaft 120, e.g., a drive spindle. During operation of hand-held power tool 100, motor 180 drives drive shaft 120 to rotate via gear transmission 109.

Drive motor 180 is situated in a motor housing 185 and gear transmission 109 is situated in a transmission housing 110 in the illustration, transmission housing 110 and motor housing 185 being situated in tool housing 105, for example. A tool receptacle 140 is assigned to gear transmission 109, which has a chuck 145, for example. This tool receptacle 140 is used to accommodate a tool 158 and may be molded onto drive shaft 120, which is drivable by drive motor 180 via gear transmission 109, or may be connected thereto in the form of an attachment.

Drive motor 180 may be turned on and off via a manual switch 195, for example, and may be an arbitrary motor type, e.g., an electronically commuted motor or a DC motor. Drive motor 180 may preferably be electronically controlled or regulated in such a way that both a reversing mode and also specifications with respect to a desired rotational speed are implementable. The mode of operation and the construction of a suitable drive motor are sufficiently known from the related art, so that an extensive description will be dispensed with here for the purpose of a concise description.

Gear transmission 109 may be designed like a reduction gear unit, for example, which is implementable using a planetary gear designed having various planetary stages, for example, to which a torque clutch 199 is optionally assigned. Torque clutch 199 is designed for the purpose of preventing driving of drive shaft 120 by gear transmission 109 during operation of hand-held power tool 100 if a torque transmitted from drive shaft 120 to gear transmission 109 exceeds a threshold value, which is settable by a user of hand-held power tool 100. However, it is to be noted that an embodiment of a suitable gear transmission having an assigned torque clutch and its mode of operation are sufficiently known to those skilled in the art, so that an illustration and more detailed description thereof will be dispensed with here for the purpose of a concise description and simple drawings.

According to one specific embodiment, a gear shifting device 130, 150 is assigned to gear transmission 109, so that gear transmission 109 is shiftable between at least one first gear having a comparatively high torque and one second gear having a comparatively low torque in the event of appropriate gear shifting procedures. Gear shifting device 130, 150 is described in detail below with reference to a side view, which is shown enlarged in FIG. 2, of a detail 200 of hand-held power tool 100.

In the illustration, gear shifting device 130, 150 has a mechanical gearshift 130 and an electronic control unit 150. Gearshift 130 is used to carry out a mechanical shift between the first gear and the second gear on gear transmission 109. Control unit 150 is designed for the purpose of at least indirectly activating drive motor 180 using suitable motor parameters in each case during operation of hand-held power tool 100 in the event of such a shift between the first gear and the second gear, in order to thus allow an operation of hand-held power tool 100 using a predefined motor speed, for example.

Figure 2:
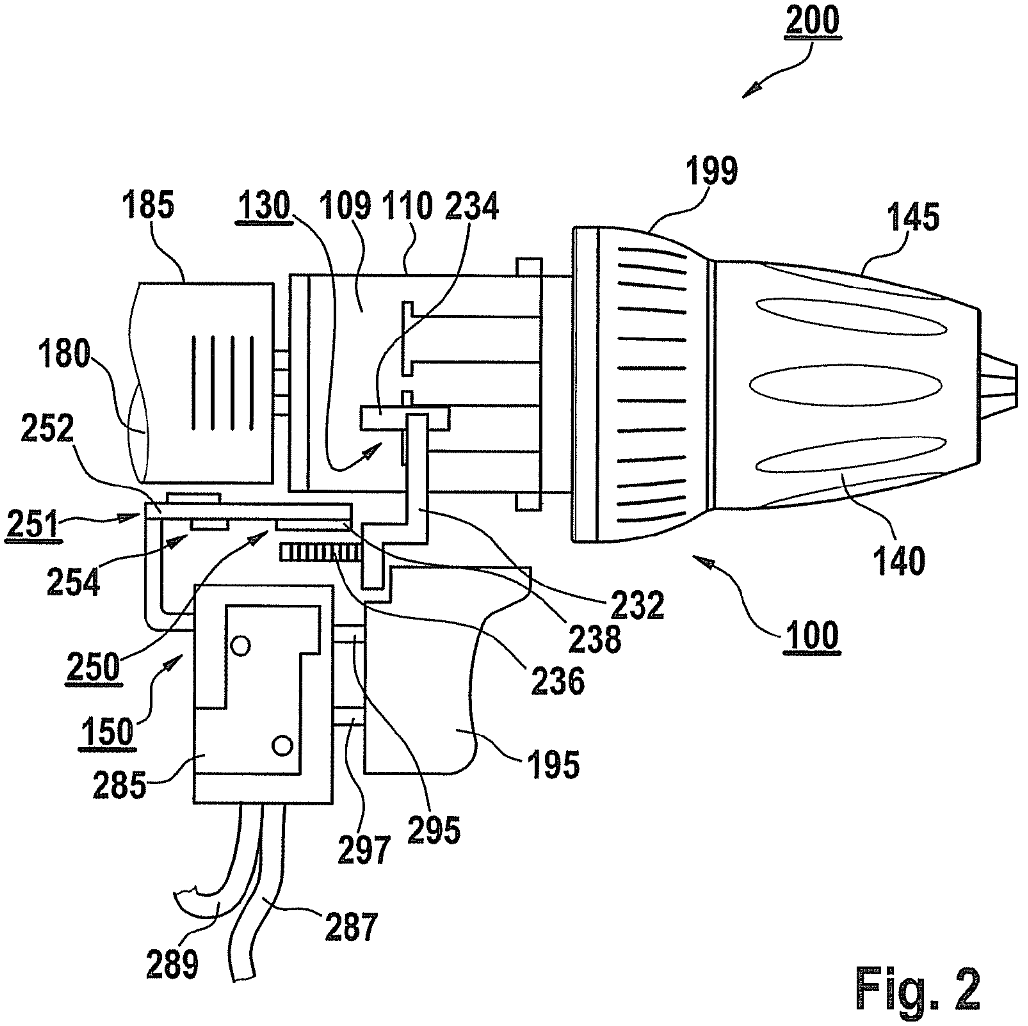
FIG. 2 shows a side view of a detail of the hand-held power tool from FIG. 1.

FIG. 2 shows detail 200 of hand-held power tool 100 from FIG. 1, an illustration of tool housing 105 from FIG. 1 having been dispensed with to illustrate a preferred specific embodiment. Detail 200 illustrates an exemplary embodiment of gear shifting device 130, 150, which is formed by gearshift 130 and control unit 150.

According to one specific embodiment, gear transmission 109 is a semiautomatic transmission, in which a mechanical shift unit 234, which is at least partially situated inside transmission housing 110, is assigned to gearshift 130 for the shift between the first gear and the second gear. This mechanical shift unit is connected to a gear shift linkage 232, which is situated outside transmission housing 110 and is also assigned to gearshift 130, and which is coupled to manual switch 195 and is displaceable thereby between a first operating position assigned to the first gear and a second operating position assigned to the second gear. In the illustration, the first operating position is a position facing toward tool receptacle 140 and the second operating position is a position facing toward drive motor 180.

Manual switch 195 is additionally connected, for example, via two tappets 295, 297 to an on/off switch 285, in order to allow drive motor 180 or hand-held power tool 100 to be turned on or off by operating manual switch 195. For this purpose, on/off switch 285 is connected in an electrically conductive manner via assigned connection lines 287, 289 to battery pack 190 from FIG. 1 and to drive motor 180.

According to one specific embodiment, control unit 150 has an electronic unit 251 and a sensor system 250 connected thereto to detect a gear shifting procedure, which is based on a shift between the first gear and the second gear. Electronic unit 251 has a printed circuit board 252, which is situated fixed on the housing in tool housing 105 from FIG. 1, in the illustration, and on which electronic components 254 and a sensor 238 are situated. Electronic components 254 are designed for the purpose of activating motor 180 using predefined motor parameters which are assigned to the detected gear shifting procedure, on the basis of a gear shifting signal which is generated by sensor system 250 when a gear shifting procedure is detected.

As an example, sensor 238 is a sensor operating in a contactless manner, e.g., a capacitive, inductive, optical, or magnetic sensor. Alternatively thereto, sensor 238 may also be designed as a sensor operating using contact, e.g., as an ohmic sensor. Sensor 238 is operatively linked to an assigned signal transducer 236, sensor 238 and signal transducer 236 forming sensor system 250, which is situated in the area of gear transmission 109, for example. According to one specific embodiment, signal transducer 236 is connected to gear shift linkage 232 or fastened thereon in such a way that signal transducer 236 is displaceable relative to sensor 238 via gear shift linkage 232 by operating manual switch 195. Sensor 238 is a capacitive sensor in the illustration of FIG. 2.

To put hand-held power tool 100 of FIGS. 1 and 2 into operation, a user of hand-held power tool 100 operates manual switch 195 and displaces it in the direction of on/off switch 285. In this way, at least one of tappets 295, 297 operates a contact in on/off switch 285 for turning on motor 180, so that motor 180 is turned on and gear transmission 109 is initially operated in the first gear.

In the event of a further displacement of manual switch 195 in the direction of on/off switch 285, manual switch 195 displaces gear shift linkage 232 in the direction of drive motor 180 in the illustration, signal transducer 236, which is fastened on gear shift linkage 232, being displaced in relation to capacitive sensor 238. This relative displacement is recognized and detected by capacitive sensor 238, which generates a gear shifting signal assigned to the displacement and supplies it to electronic components 254. These components activate drive motor 180, e.g., via on/off switch 285 as described above using predefined motor parameters, which are assigned to the detected gear shifting procedure, on the basis of the gear shifting signal.

Figure 3:
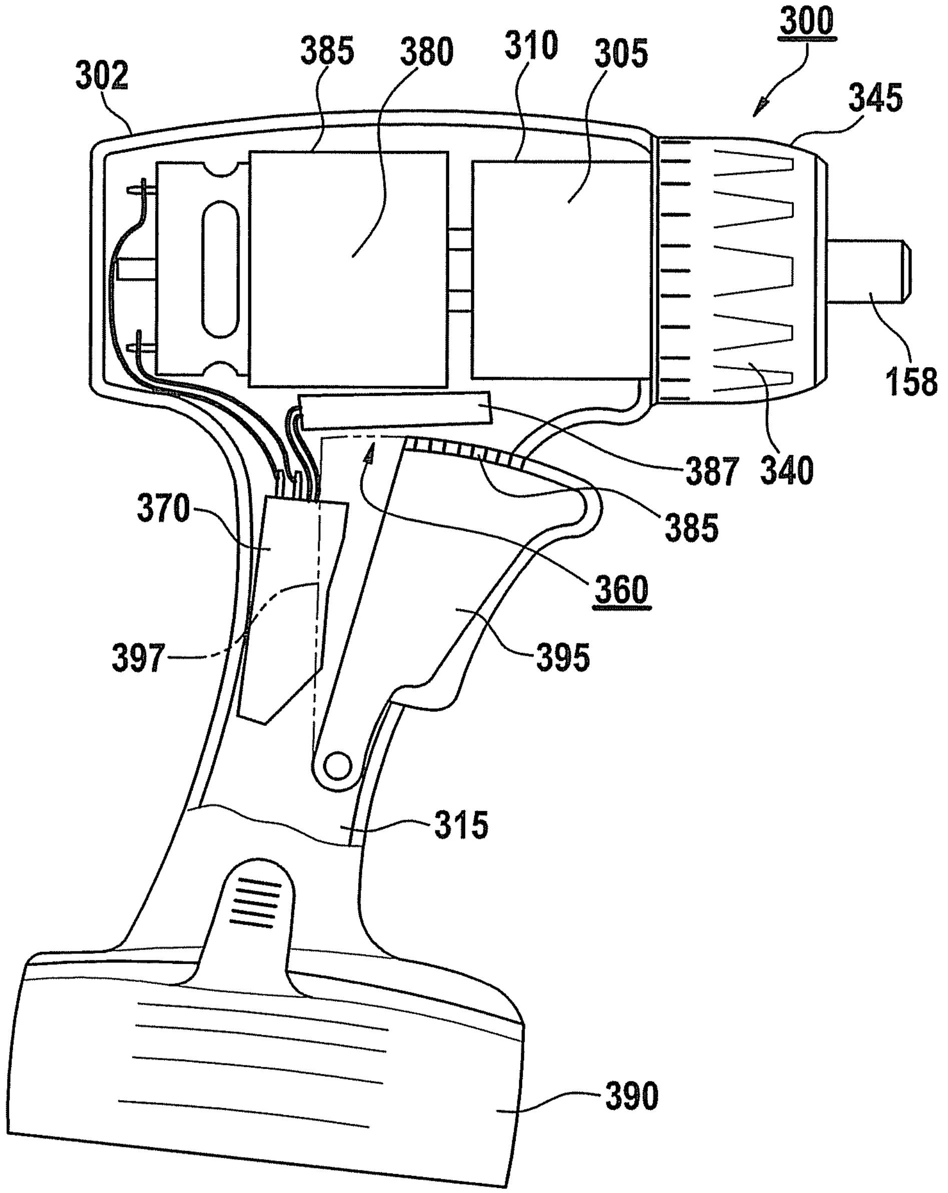
FIG. 3 shows a side view of a hand-held power tool according to a further specific embodiment.

FIG. 3 shows an alternative specific embodiment of an exemplary hand-held power tool 300, which is constructed similarly to hand-held power tool 100 from FIGS. 1 and 2 and has a tool housing 302, which is shown partially transparent, having a handle 315. Like hand-held power tool 100 from FIGS. 1 and 2, hand-held power tool 300 is mechanically and electrically connectable to a battery pack 390 in the illustration for the network-independent power supply and has an electrical drive motor 380, which is situated in tool housing 302 and is supplied with power from battery pack 390 via an assigned electronic component 370, and a gear transmission 305. Electronic component 370 is designed, for example, like an on/off switch. Drive motor 380 is connected via gear transmission 305 to a drive shaft, e.g., a drive spindle. During operation of hand-held power tool 300, drive motor 380 drives the driveshaft via gear transmission 305.

Drive motor 380 is situated in a motor housing 385 in the illustration and gear transmission 305 is situated in a transmission housing 310, transmission housing 310 and motor housing 385 being situated in tool housing 302, for example. For example, a tool receptacle 340 is assigned to gear transmission 305, which has a chuck 345 and is used to accommodate tool 158 from FIG. 1, for example.

For example, drive motor 380 may be turned on and off via a manual switch 395, which is displaceable between a first operating position shown in FIG. 3 and a second operating position indicated by a dashed line 397, and may be an arbitrary motor type like motor 180 from FIGS. 1 and 2. Gear transmission 305 is an automatic transmission in the illustration and may be designed, for example, like a reduction gear unit, which is implementable using a planetary transmission designed having various planetary steps, for example. However, it is to be noted that the present invention is not restricted to use with automatic and semiautomatic transmissions, but rather may also be used in manually shiftable transmissions.

According to one specific embodiment, a gear shifting device 360 is assigned to gear transmission 305, so that gear transmission 305 is shiftable at least between a first gear having a comparatively high torque and a second gear having a comparatively low torque, for example, in the event of appropriate gear shifting procedures. Gear shifting device 360 has at least one sensor 387 and a signal transducer 385 in the illustration, which may be composed as described in FIG. 2. In the illustration, sensor 387 is a magnetic sensor, which is preferably situated fixed to the housing in tool housing 302, e.g., on an assigned printed circuit board. Signal transducer 385 is a magnet or a ferrite, for example, which is situated or fastened on manual switch 395 and is displaceable relative to magnetic sensor 387 using this manual switch.

To put hand-held power tool 300 into operation, a user of hand-held power tool 300 operates manual switch 395 and displaces or pivots it in the direction of electronic components 370, magnet 385 being displaced relative to magnetic sensor 387. This relative displacement is recognized and detected by magnetic sensor 387, upon which hand-held power tool 300 is turned on and a gear shifting signal, which is assigned to the displacement, is generated and supplied to electronic component 370, which is used as described above in the case of FIG. 2 for the motor control and additionally for the initialization of a mechanical shift between the first gear and the second gear.

What is claimed is:

1. A hand-held power tool comprising:
a driveshaft;
a motor;
a gear transmission, which is drivable by the motor, to drive the driveshaft;
a gear shifting device for shifting the gear transmission at least between a first gear and a second gear, the gear shifting device including a sensor system for detecting a gear shifting procedure; and
an electronic unit, coupled to the sensor system, for controlling the motor using predefined motor parameters which are assigned to the detected gear shifting procedure, on the basis of a gear shifting signal generated by the sensor system when the gear shifting procedure is detected,
wherein the gear shifting device includes a gear shift linkage for a mechanical shift between the first gear and the second gear, which is connected to a signal transducer assigned to the sensor system,
wherein the gear shift linkage is connected to a manual switch for turning on the motor, the signal transducer being displaceable relative to a sensor via the gear shift linkage by operating the manual switch.

2. The hand-held power tool according to claim 1, wherein the sensor system detects a gear shifting procedure in a contactless manner.

3. The hand-held power tool according to claim 1, wherein the sensor system includes a capacitive sensor.

4. The hand-held power tool according to claim 1, wherein the sensor system includes a magnetic sensor.

5. The hand-held power tool according to claim 1, wherein the sensor system includes an inductive sensor.

6. The hand-held power tool according to claim 1, wherein the sensor system includes an optical sensor.

7. The hand-held power tool according to claim 1, wherein the sensor system detects a gear shifting procedure using contact.

8. The hand-held power tool according to claim 1, wherein the sensor system includes an ohmic sensor.

9. The hand-held power tool according to claim 1, wherein the sensor system is situated in proximity to the gear transmission.

10. The hand-held power tool according to claim 1, wherein the signal transducer, which is assigned to the sensor system, is connected to the manual switch for turning on the motor, and is displaceable relative to the sensor by operating the manual switch.

* * * * *